United States Patent
Lemay et al.

(10) Patent No.: US 9,669,738 B2
(45) Date of Patent: Jun. 6, 2017

(54) VEHICLE ACCESS SYSTEM

(71) Applicant: ADAPT SOLUTIONS, St-Lambert-de-Lauzon (CA)

(72) Inventors: Christian Lemay, St-Lambert-de-Lauzon (CA); Etienne Carbonneau, St-Charles (CA)

(73) Assignee: ADAPT SOLUTIONS, Quebec (CA)

( * ) Notice: Subject to any disclaimer, the term of this patent is extended or adjusted under 35 U.S.C. 154(b) by 0 days.

(21) Appl. No.: 14/800,983

(22) Filed: Jul. 16, 2015

(65) Prior Publication Data

US 2016/0016489 A1  Jan. 21, 2016

Related U.S. Application Data

(60) Provisional application No. 62/025,090, filed on Jul. 16, 2014.

(51) Int. Cl.
*B60N 2/14* (2006.01)
*B60N 2/24* (2006.01)
*B60N 2/02* (2006.01)

(52) U.S. Cl.
CPC .......... *B60N 2/245* (2013.01); *B60N 2/0232* (2013.01); *B60N 2/14* (2013.01)

(58) Field of Classification Search
CPC ........ B60N 2/245; B60N 2/14; B60N 2/3063; B60N 2/0232
See application file for complete search history.

(56) References Cited

U.S. PATENT DOCUMENTS

| | | | | |
|---|---|---|---|---|
| 6,557,919 B2 * | 5/2003 | Hijikata | ............... | B60N 2/062 296/65.07 |
| 6,572,172 B1 * | 6/2003 | Ninomiya | ............ | B60N 2/0232 296/65.07 |
| 7,000,991 B2 * | 2/2006 | Seki | ....................... | B60N 2/245 296/65.12 |
| 7,316,441 B2 * | 1/2008 | Iwatani | ................. | B60N 2/067 296/65.12 |
| 7,413,232 B1 * | 8/2008 | Fukui | ..................... | B60N 2/245 296/65.09 |
| 7,789,447 B2 * | 9/2010 | Tomaiwa | ............ | B60N 2/0232 296/65.11 |
| 8,033,589 B2 * | 10/2011 | Kusanagi | ............... | B60N 2/045 296/65.07 |
| 8,033,605 B2 * | 10/2011 | Miura | ...................... | B60N 2/14 296/65.07 |
| 2012/0261955 A1 * | 10/2012 | Ilda | ...................... | B60N 2/0252 297/188.04 |
| 2013/0113258 A1 * | 5/2013 | Slungare | .................. | B60N 2/14 297/344.21 |

* cited by examiner

*Primary Examiner* — Philip Gabler
(74) *Attorney, Agent, or Firm* — Daniel A. Tallitsch; Baker & McKenzie LLP

(57) ABSTRACT

The embodiments described and claimed herein are improved vehicle access systems. In particular, one embodiment includes three compact, motorized mechanisms for pivoting a passenger seat toward a door opening, extending the passenger seat outside the door opening, lowering the passenger seat, and tilting the passenger seat to help the passenger stand. The first mechanism concurrently pivots the passenger seat and moves it sideways during the pivoting operation so that it is aligned with the door opening. The second mechanism extends the passenger seat outside the door opening. The third mechanism lowers the seat.

14 Claims, 16 Drawing Sheets

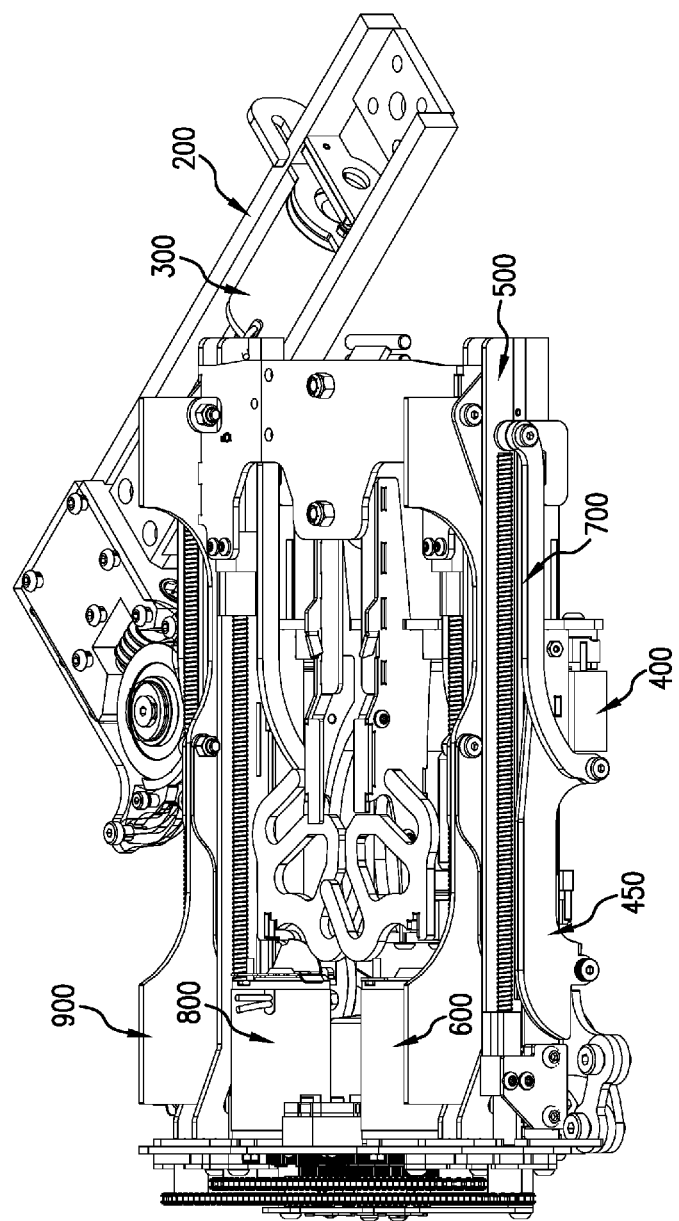

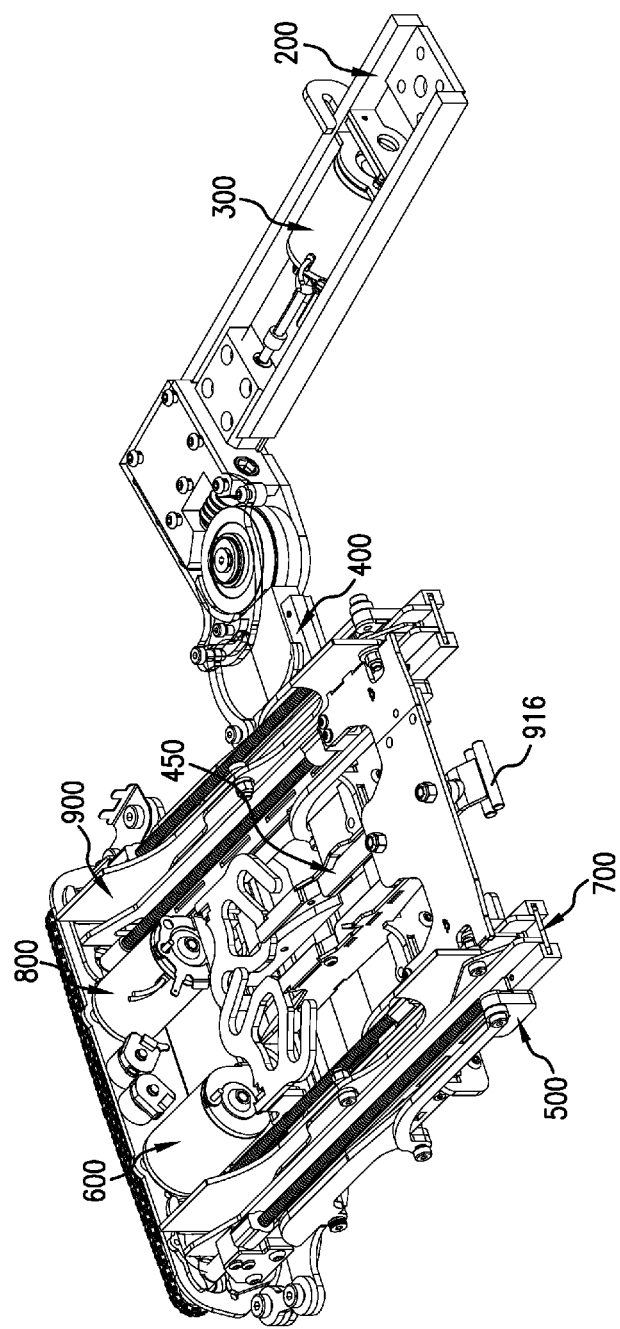

VEHICLE ACCESS SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to a method, system, or device that permits easy access to a vehicle for a disabled person. More specifically, at least some of the embodiments described herein relate to a method, system, or device for enabling safe transfer from a wheelchair to the seat of a vehicle by lowering the seat down and out of the vehicle.

Background Art

Current devices known in the art are large and cumbersome, and therefore usually require replacement of the original equipment manufacturer ("OEM") seat. Accordingly, there is a need for an improved device that is compact and allows the user to maintain the OEM seat and associated safety features.

BRIEF SUMMARY

The embodiments described and claimed herein solve at least some of the problems of the prior art vehicle access systems. In one embodiment, a vehicle access system comprises a seat base for supporting a vehicle seat. The seat base includes a base flange, a pivot member, and a shuttle. The base flange is adapted for securement to a floor of a vehicle. The pivot member is pivotally attached to the base flange and is configured to pivot the vehicle seat at least partially out of a vehicle door opening. The shuttle is supported by the pivoting member, is movable along a length of the pivot member, and is configured to align the vehicle seat with a vehicle door opening. The trolley base is supported by and tilts relative to the shuttle, and is configured to lower the vehicle seat outside of the vehicle door opening. The trolley is supported by the trolley base, is movable along a length of the trolley base, and is configured to extend the vehicle seat outside of the vehicle door opening and lower the vehicle seat. The seat support assembly is pivotally attached to the trolley, is adapted to support the vehicle seat, and is configured to tilt the vehicle seat relative to the trolley.

Another embodiment includes a pivoting mechanism. The pivoting mechanism comprises a motor that powers a pivot gear and a linkage assembly. The pivot gear is configured to pivot the pivot member relative to the base flange, while the linkage assembly is configured to move the shuttle along the length of the pivot member.

Yet another embodiment includes a tilting mechanism. The tilting mechanism comprises a motor that powers a trolley base tilt linkage assembly and a seat tilt linkage assembly. The trolley tilt linkage assembly is configured to tilt the trolley base relative to the shuttle. The seat tilt linkage assembly is configured to tilt the vehicle seat relative to the trolley.

Yet another embodiment includes an extend mechanism. The extend mechanism comprises a motor for moving the trolley along the length of the trolley base.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEWS OF THE DRAWINGS.

These and other features, aspects, objects, and advantages of the embodiments described and claimed herein will become better understood upon consideration of the following detailed description, appended claims, and accompanying drawings where:

FIG. 2B is a perspective view of the seat base in a partially pivoted configuration;

FIG. 2C is a perspective view of the seat base in a fully pivoted configuration;

Figure 1A:
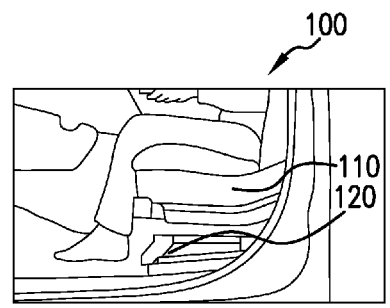
FIG. 1A is a side view of a vehicle showing a first embodiment of a seat base (driver side application) in the fully retracted position.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Referring first to FIGS. 1A-1E, a first embodiment of a vehicle access system 100 is shown for enabling safe transfer from a wheelchair to a vehicle seat. The first embodiment of the vehicle access system includes an OEM seat 110 and a seat base 120. The seat base 120 is designed to replace the OEM seat base and to bolt into the OEM bolt holes on the vehicle floor and seat 110, rendering it unnecessary to modify the structure of the vehicle.

Figure 1B:
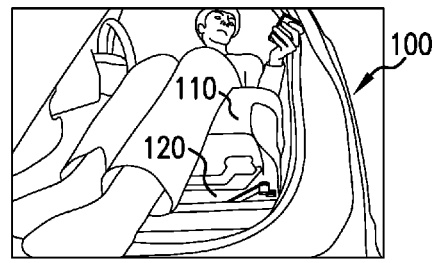
FIG. 1B is a side view of the vehicle showing the seat base pivoted partially out of the vehicle.
Figure 1C:
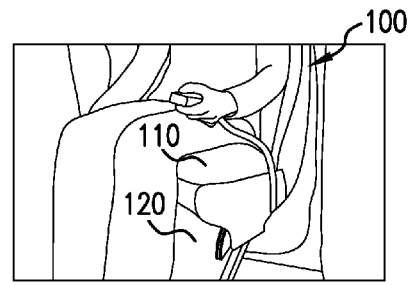
FIG. 1C is a side view of the vehicle showing the seat base fully pivoted and fully extended out of the vehicle and partially lowered.
Figure 1D:
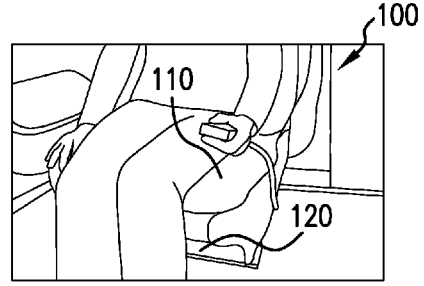
FIG. 1D is a side view of the vehicle showing the seat base fully pivoted out of the vehicle and fully lowered.
Figure 1E:
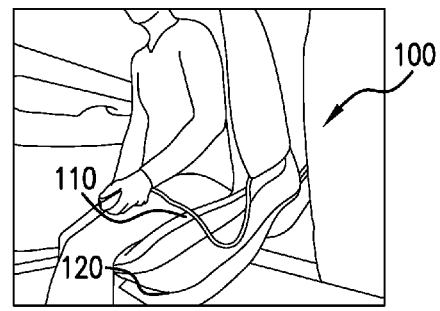
FIG. 1E is a side view of the vehicle showing the seat base fully pivoted out of the vehicle and tilted to help the passenger stand up.

The seat base 120 comprises a powered mechanism with a programmable controller (not shown) for pivoting, extending, lowering, and tilting the seat 110 from a use position, as shown in FIG. 1A, to a stand assist position, as shown in FIG. 1E. More particularly, the seat base 120 pivots the seat 110 from the use position (FIG. 1A) to a position at least partially outside of the vehicle (FIG. 1B). The seat base 120 then extends the seat 110 to a position at least mostly outside of the vehicle (FIG. 1C). The seat base 120 then lowers the seat 110 while maintaining the seat generally parallel to the ground (FIG. 1D). Finally, the seat base 120 tilts the seat 110 to help the passenger stand up. Other embodiments of the seat base 120 can be programmed to include any one or more of the previous steps in any order.

Referring now to FIGS. 2A-2F, the seat base 120 generally comprises a base flange 200, a pivot mechanism 300, a pivot member 400, a shuttle 450, a trolley base 500, an extend mechanism 600, a trolley 700, a lowering mechanism 800, and a seat support assembly 900. The pivot mechanism 300 supports the pivot member 400, the pivot member 400 supports the shuttle 450, the shuttle 450 supports the trolley base 500, the trolley base 500 supports the trolley 700, and the trolley 700 supports the seat support assembly 900. The base flange 200 is designed to be secured to the vehicle floor, and for that purpose includes plurality of bores 210 that are designed to engage with a vehicle specific installation kit that aligns with the OEM bolt pattern on the vehicle floor.

Figure 2A:
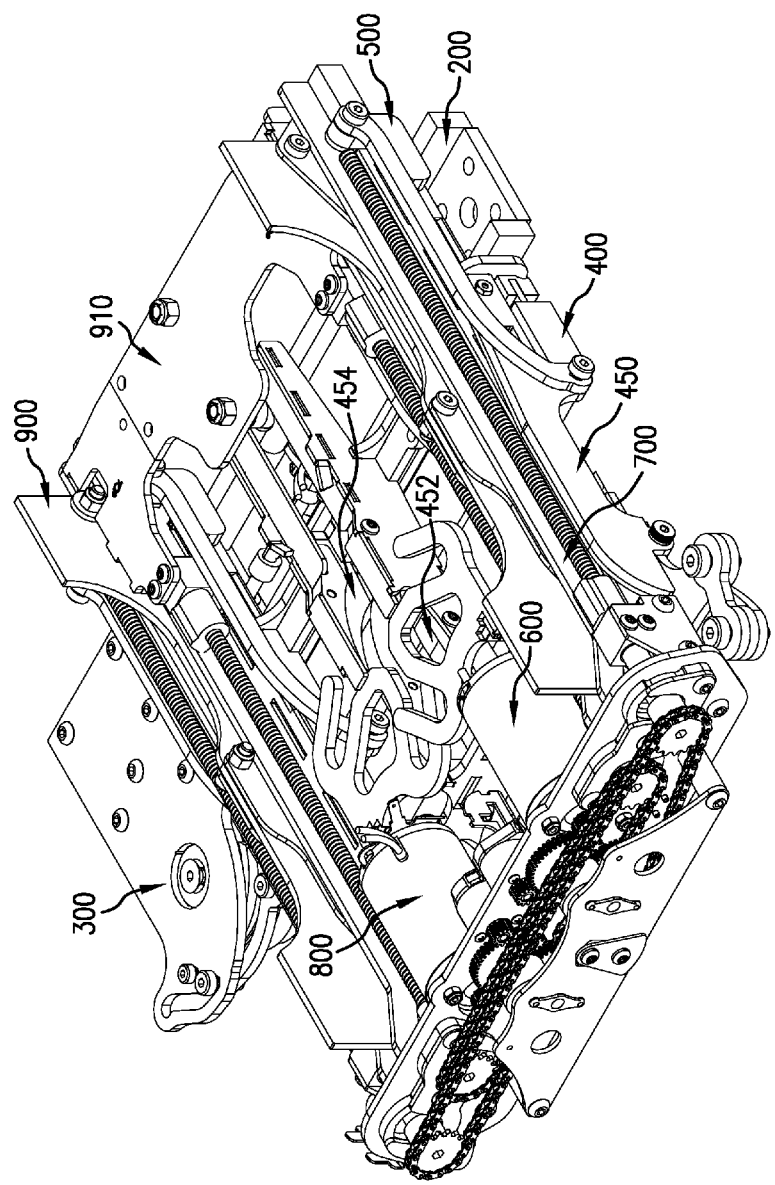
FIG. 2A is a perspective view of a second embodiment of the seat base (passenger side application) in the fully retracted position.
Figure 2D:
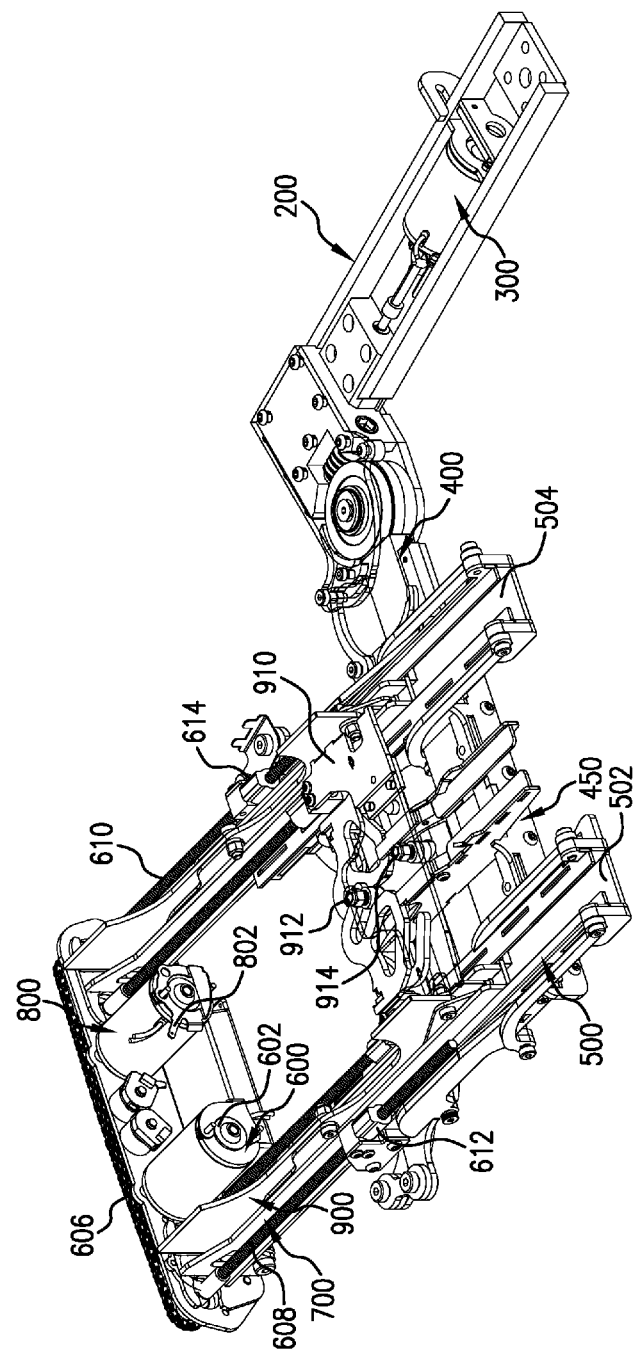
FIG. 2D is a perspective view of the seat base in a fully pivoted and partially extended configuration.
Figure 2E:
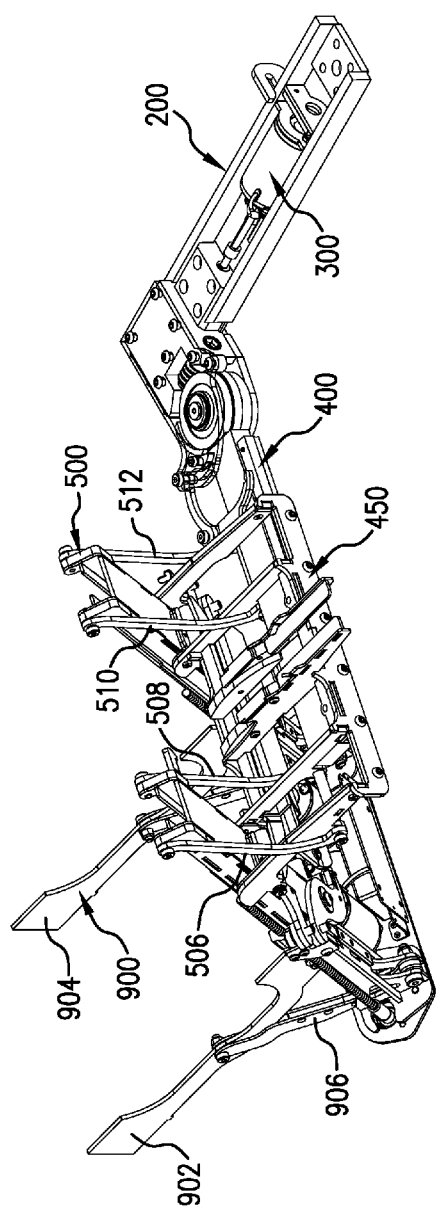
FIG. 2E is a perspective view of the seat base in a fully pivoted, partially extended, and lowered configuration.
Figure 2F:
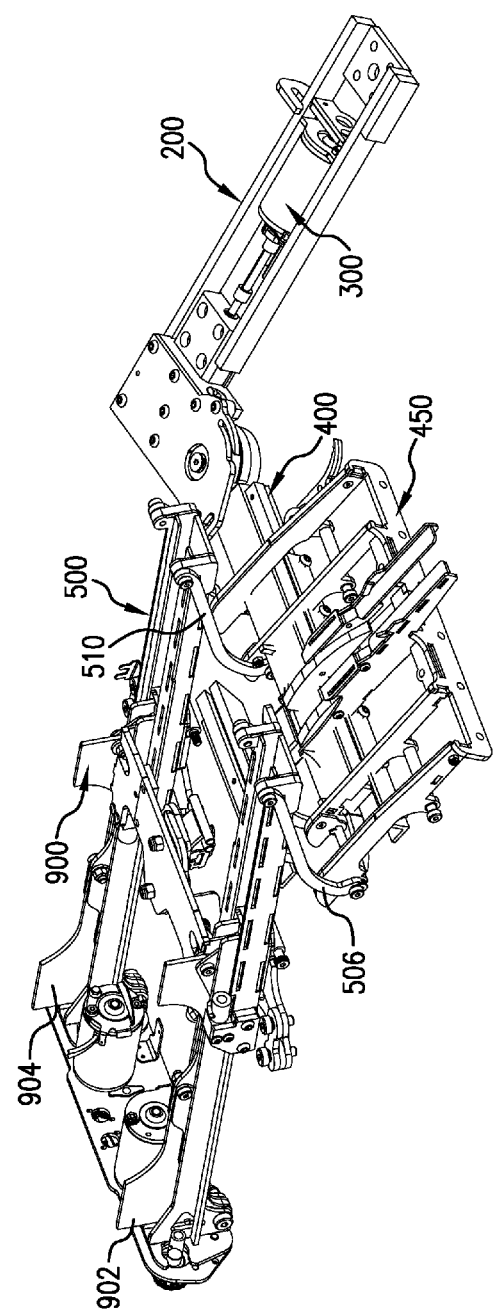
FIG. 2F is a perspective view of the seat base in a fully pivoted, partially extended, lowered, and tilted configuration.

As shown best in FIGS. 2A-2C, the pivot mechanism 300 interconnects the base flange 200 and the pivot member 400, and causes the pivot member 400 to pivot relative to the base flange 200. The pivot mechanism 300 also causes the shuttle 450, the trolley base 500, trolley 700, and seat support assembly 900 to move along the length of the pivot member 400 during the pivot operation to align the seat 110 with the vehicle door opening.

Figure 3A:
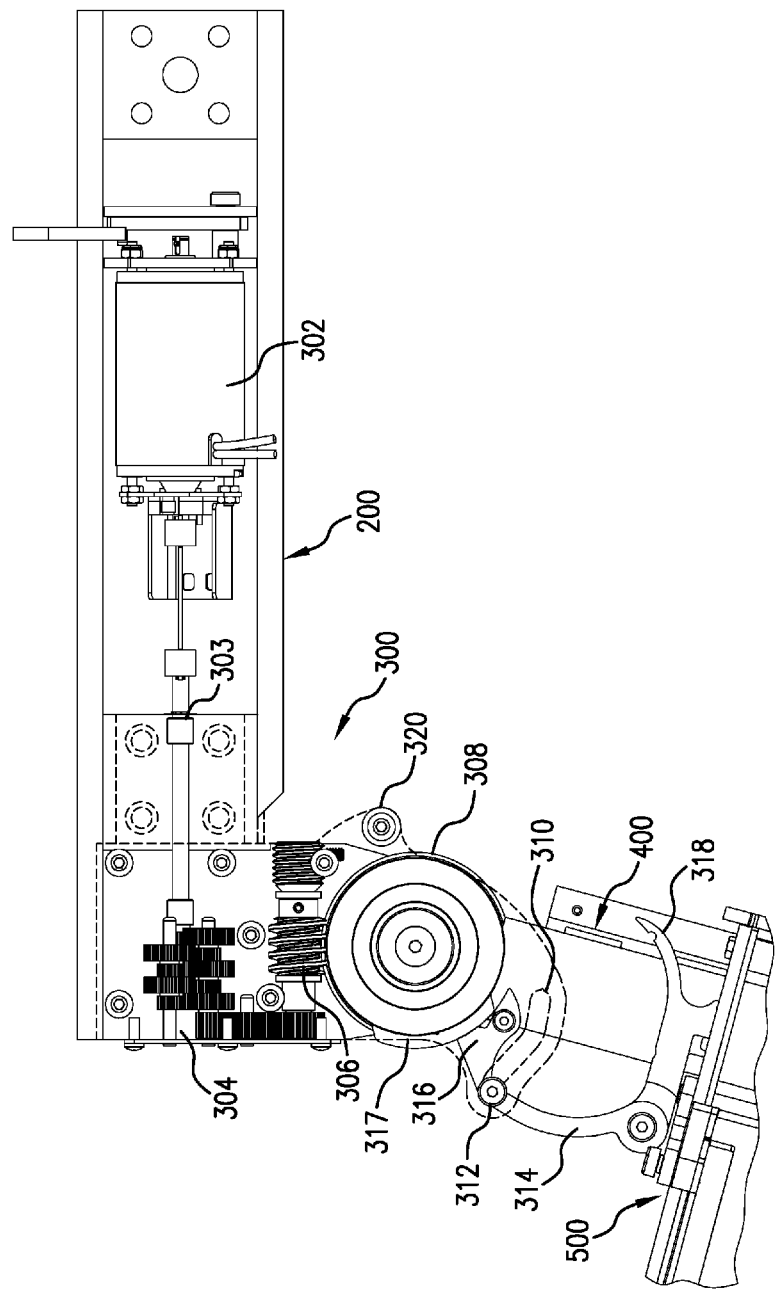
FIG. 3A is a top view of the pivot mechanism for the seat base when placed in a fully pivoted configuration.
Figure 3B:
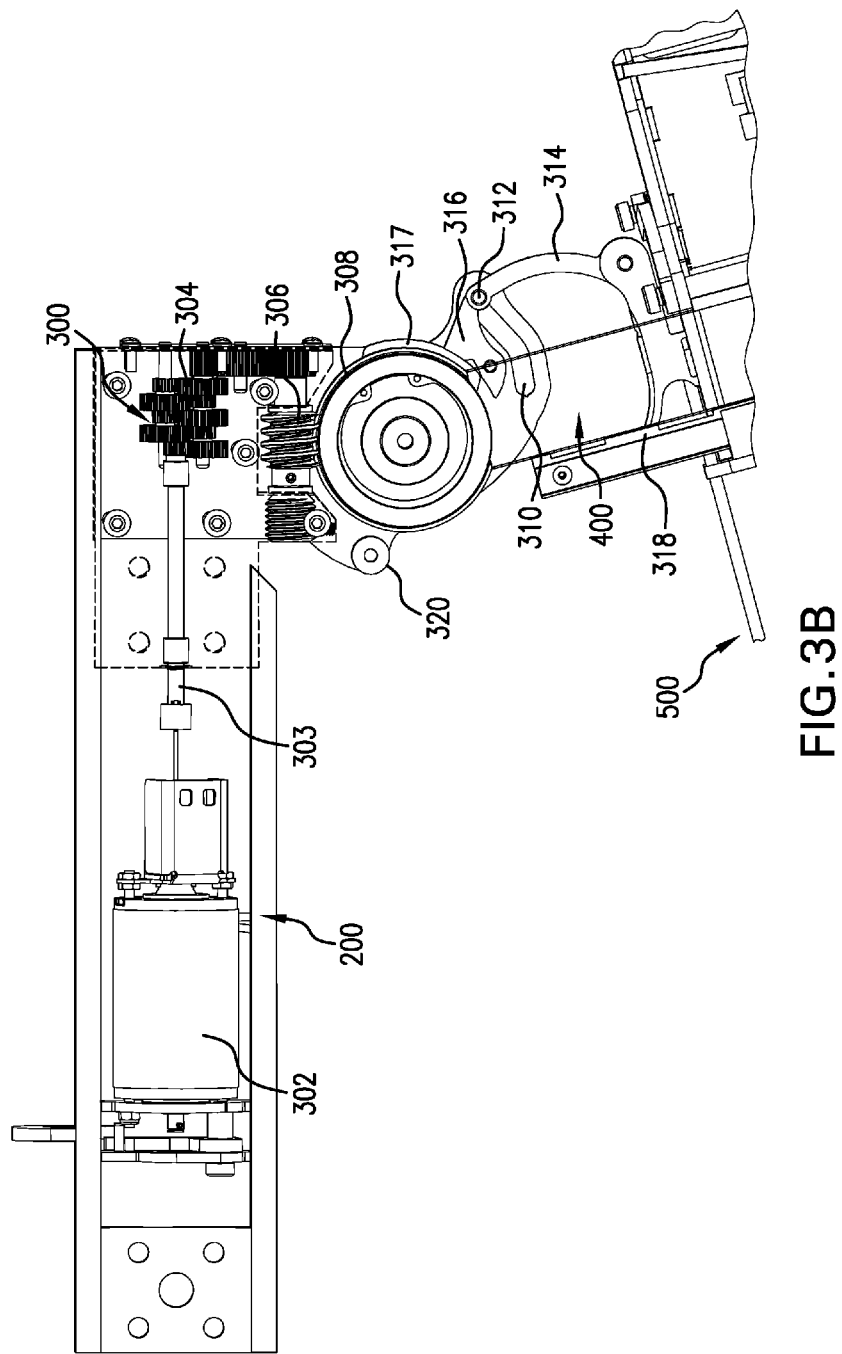
FIG. 3B is a bottom view of the pivot mechanism for the seat base when placed in a partially pivoted configuration.

The pivot mechanism 300 is best shown in FIGS. 3A and 3B. The pivot mechanism 300 comprises a pivot motor 302, a motor shaft 303, a speed-reducing gearbox 304, a worm 306, a worm gear 308, a slot 310, a slide pin 312, a slide link 314, a cam-operated slide lock 316, a lock cam 317, a wedge 318, and a wedge pin 320. The motor shaft 303 and speed-reducing gearbox 304 transfer power to the worm gear 308 from the pivot motor 302. Because the worm 306 is affixed to the base flange 200 and the worm gear 308 is affixed to the pivot member 400, powering the motor 302 in one direction causes the pivot member 400 to pivot away from the base flange 200 whereby the seat 105 is pivoted out the vehicle door opening. Powering the motor 302 in the other direction causes the pivot member 400 to pivot toward the base flange 200 whereby the seat is pivoted back into the vehicle to its use position.

In some vehicles, depending upon the size and positioning of the door opening, it may be necessary to move the seat laterally, along the length of the pivoting member. To effectuate that lateral movement, the pivot mechanism includes a slot 310, a slide pin 312, a slide link 314, a slide lock 316, a lock cam 317, a wedge 318, and a wedge pin 320. The size and shape of those components are specific to the vehicle type to ensure precise alignment of the seat 105 with the vehicle door opening.

Figure 4A:
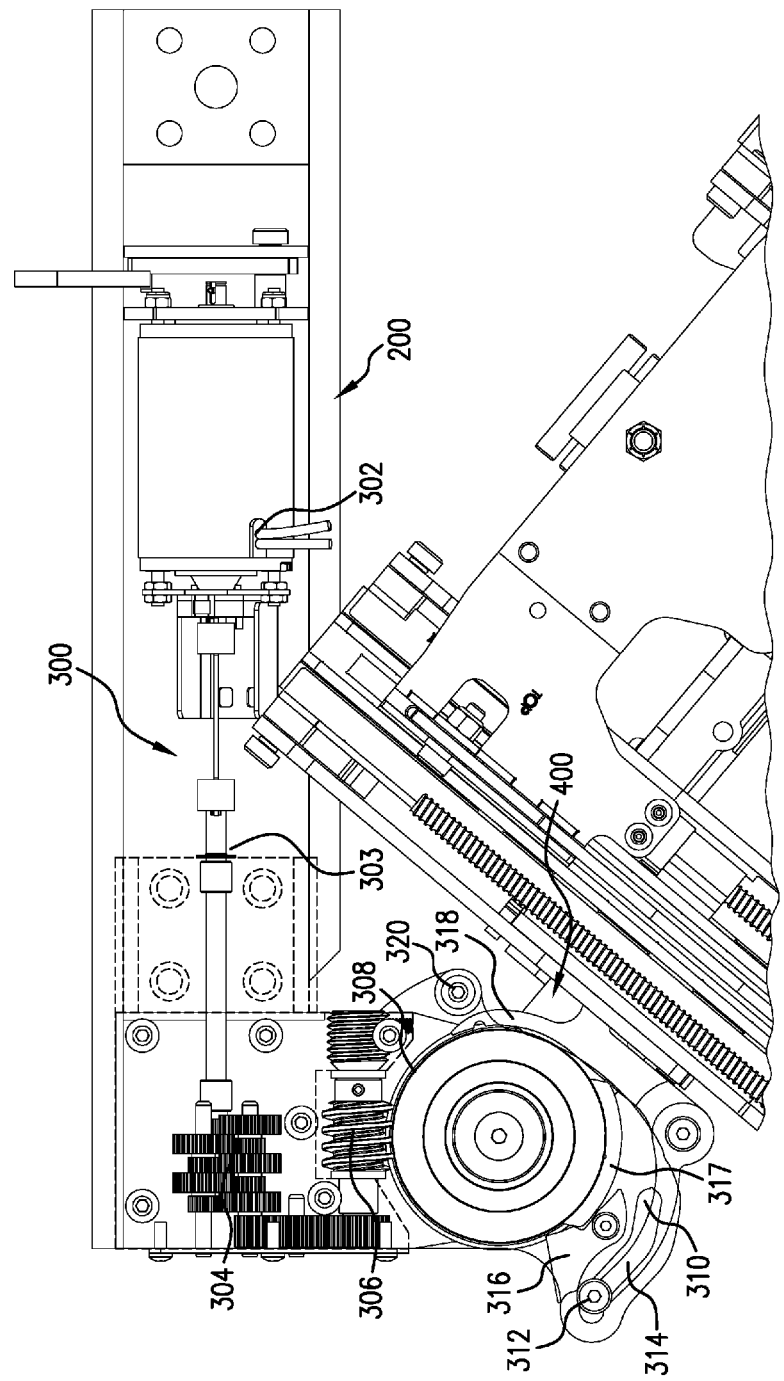
FIG. 4A is a top view of the pivot mechanism for the seat base when placed in a partially pivoted configuration.
Figure 4B:
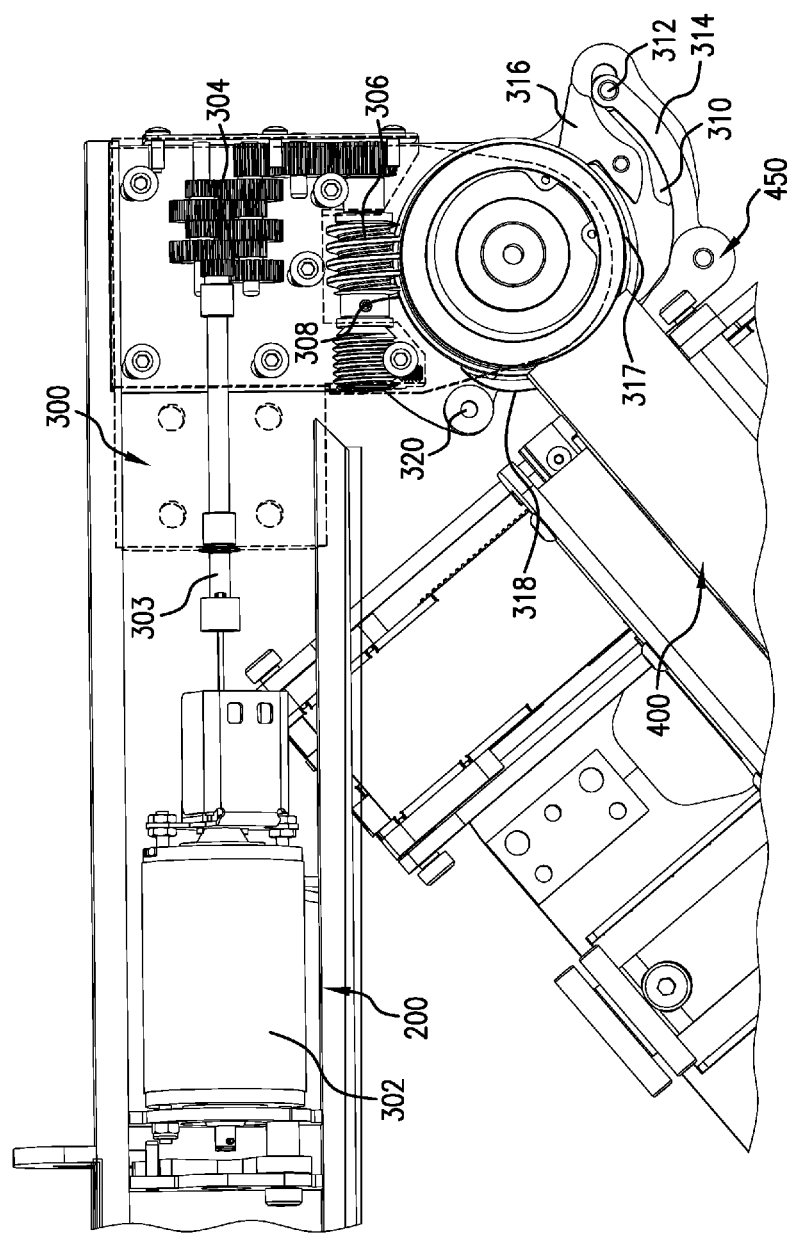
FIG. 4B is a bottom view of the pivot mechanism for the seat base when placed in a fully pivoted configuration.
Figure 5:
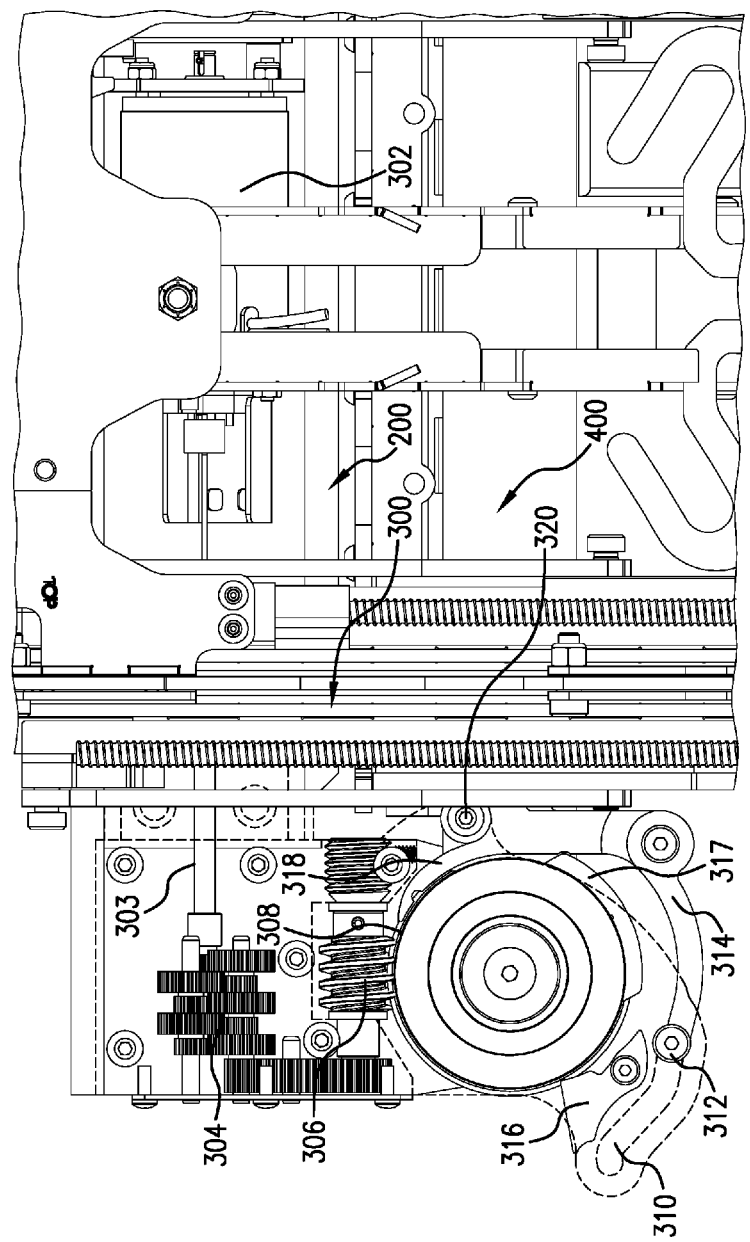
FIG. 5 is a top view of the pivot mechanism for the seat base when placed in a fully retracted configuration.
Figure 6:
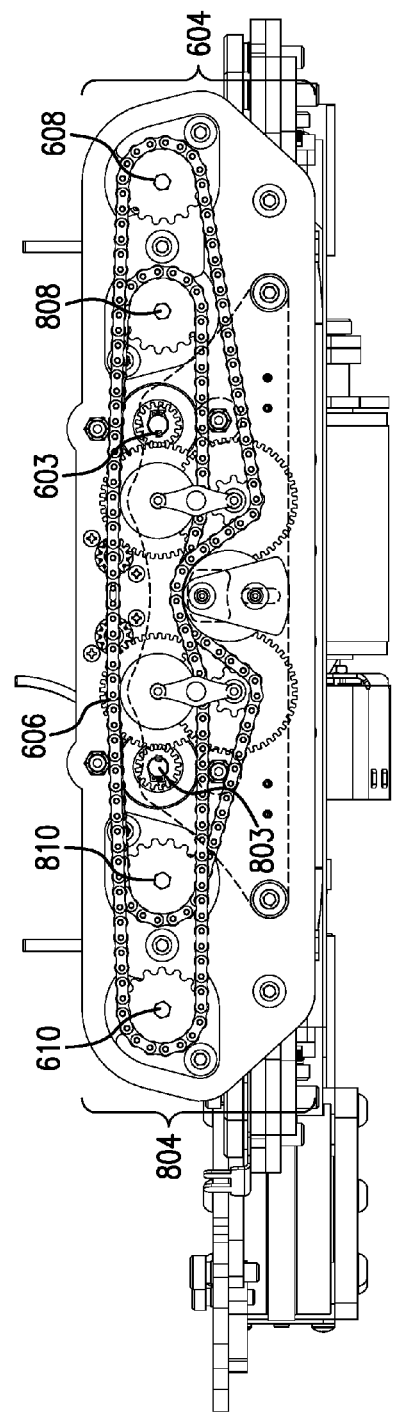
FIG. 6 is a front view of the seat base when placed in a fully refracted configuration.
Figure 7:
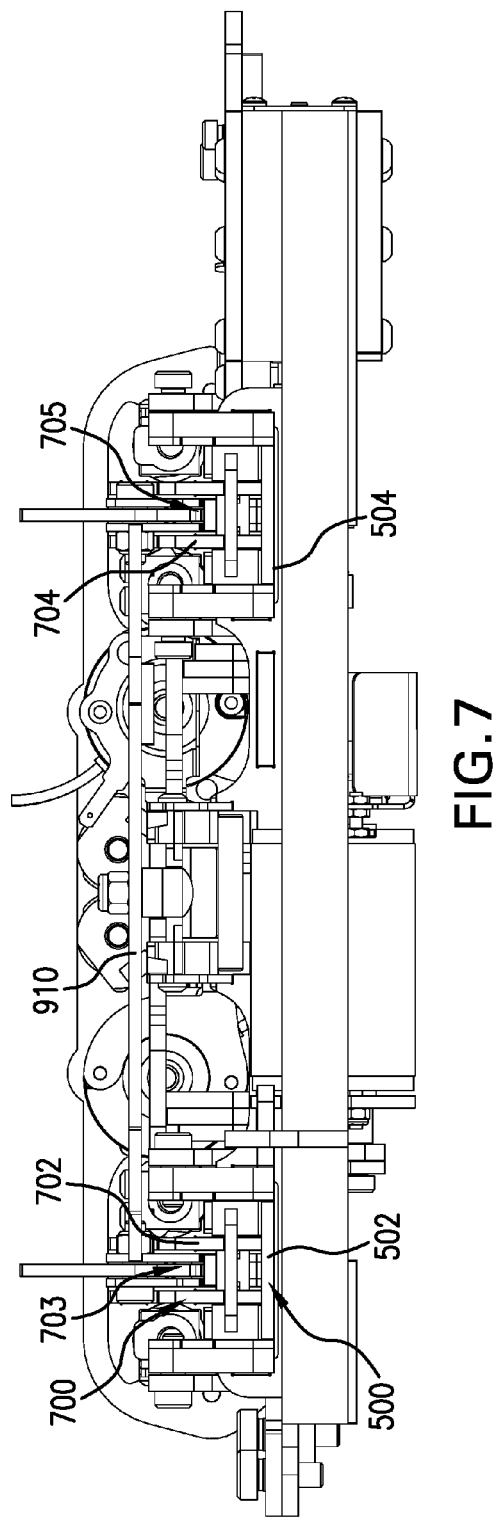
FIG. 7 is a rear view of the seat base when placed in a fully retracted configuration.
Figure 8:
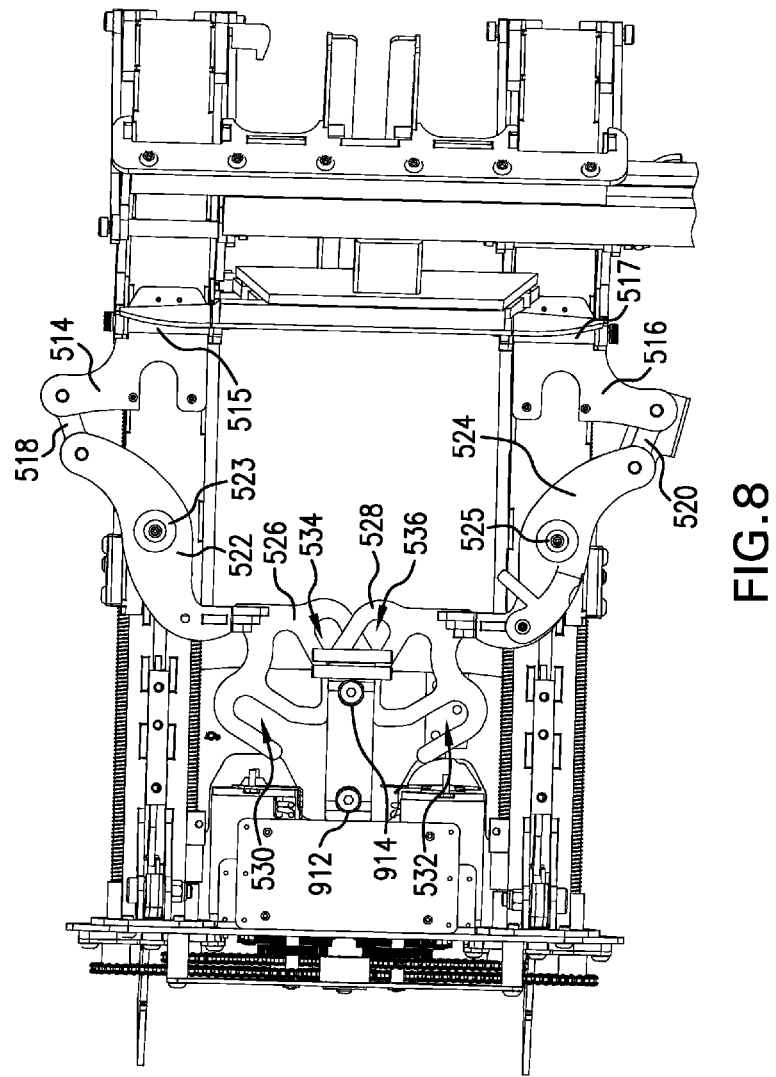
FIG. 8 is a bottom view of the seat base when placed in a fully pivoted, partially extended, and lowered configuration; and, FIG. 9 is a top view of the seat base when placed in a fully pivoted, partially extended, and lowered configuration.
Figure 9:
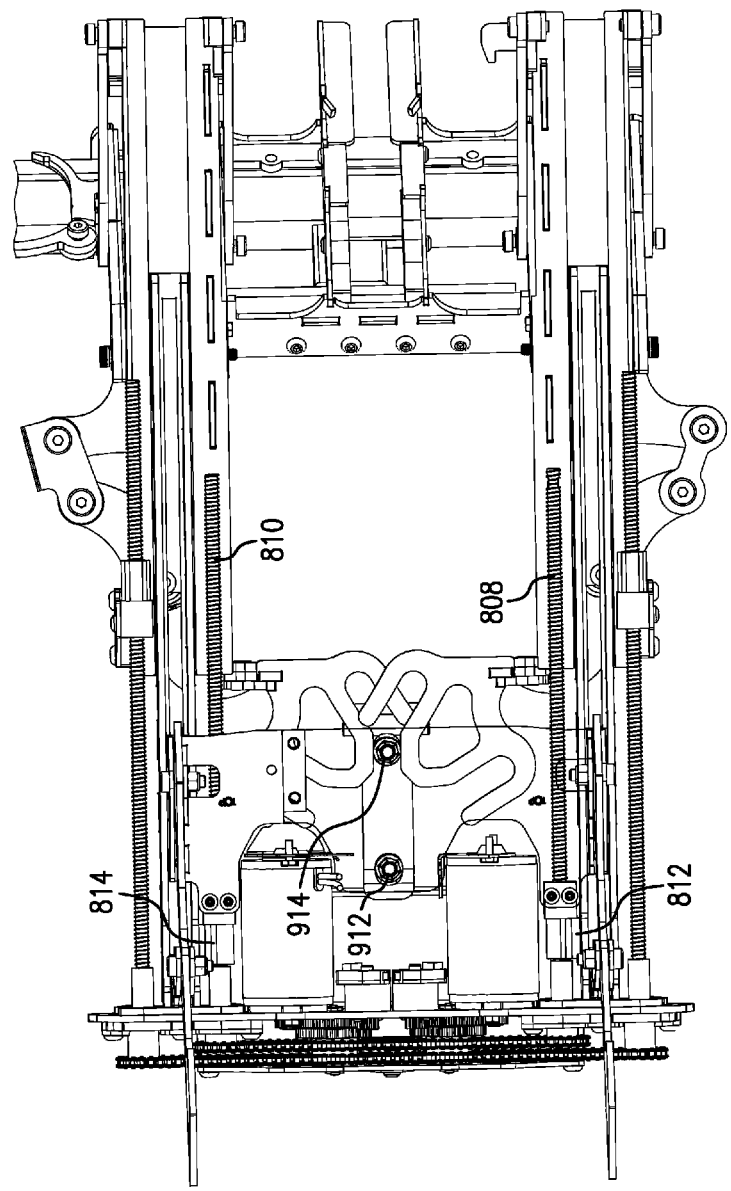

The operation of those components are best demonstrated by comparison of FIGS. 3A and 3B with FIGS. 4A and 4B. In particular, the slot 310 is rigidly affixed to the base flange 200. The slide pin 312 if affixed to a first end of the slide link 314. The second end of the slide link 314 is pivotally attached to the shuttle 450. The cam-operated lock 316 is pivotally affixed to the base flange 200, while the lock cam 317 is affixed to and rotates with the pivot member 400. The cam-operated lock 316, when engaged with the lock cam 317 as shown in FIGS. 3A and 3B, serves to lock the slide pin 312 at a first end of the slot 310. When the slide pin 312 is locked, the slide link 314 pulls or pushes the shuttle 450 along the length of the pivot member 400 when the pivot motor 302 is powered to rotate the pivot member 400 in one direction (from FIG. 3A to FIG. 4A) or in the other direction (from FIG. 4A to FIG. 3A), respectively. As the pivot member 400 and lock cam 317 are rotated toward the base flange 200, the cam-operated lock 316 disengages from the lock cam 317 and releases the slide pin 312 so that it can slide toward the second end of the slot 310. As best shown in FIG. 5, wedge 318 engages with wedge pin 320 when the seat 105 is placed in the use position to prevent movement of the shuttle 450 along the length of the pivot member 400.

As shown best in FIGS. 2C, 2D, 6 and 7, the extend mechanism 600 causes the trolley 700 to move along the length of the trolley base 500, whereby the seat 105 is extended out the vehicle door opening (compare FIGS. 1B and 1C). More particularly, the trolley 700 includes two feet 702, 704, each shaped like an inverted double-"T", that are encapsulated by a low friction material, such as Nyloil (a self lubricating high density nylon), and ride within two tracks 502, 504 in the trolley base 500. The tracks 502, 504 are generally rectangular shaped with an open slot on the top surface to receive and hold the two feet 702, 704. The extend mechanism 600 comprises an extend motor 602 with an extend motor shaft 603 that is engaged with a extend sprocket mechanism 604 and an extend chain 606. The sprocket mechanism 604 transfers power from the extend motor 602 to the two threaded extend rods 608, 610 positioned at opposite sides of and rotationally attached to the trolley. The threaded extend rods 608, 610 engage with two extend threaded nuts 612, 614 that are affixed to the trolley base 500. Powering the extend motor 602 in a first direction causes the extend rods 608, 610 to rotate within the extend nuts 612, 614 in a first direction whereby the trolley 700 and the seat 105 are extended out the vehicle door opening. Powering the extend motor 602 in an opposite direction causes the extend rods 608, 610 to rotate within the extend nuts 612, 614 in an opposite direction whereby the trolley 700 and the seat 105 are retraced in the vehicle door opening.

As best shown in FIGS. 2D, 2E, 8, and 9, the lowering mechanism 800 lowers the seat 105 and holds the seat 105 generally horizontal, by simultaneously tilting the trolley base 500 relative to the shuttle 450 and erecting the seat support assembly 900.

Erection of the seat support assembly 900 is enabled by two seat supports 902, 904, links 906, 908, and sled 910. The two seat supports 902, 904 are vehicle specific and attach to the underside of and support the vehicle seat 105. The links 906, 908 are secured to the trolley 700 at one end and, at the opposite end, to approximately the mid-point of the seat supports 902, 904. The first ends of the seat supports 902, 904 are free, while the other ends are pivotally secured to the sled 910. The sled 910 rides in channels 703, 705 formed on the top side of the double-"T" shaped feet 702, 704 of the trolley 700. The sled 910 includes first pin 912, second pin 912, the functions of which are described below. The sled 910 also includes a "T"-shaped trailing bar 916 that rides in channels 452, 454 that are secured to the shuttle 450, as described in more detail below. Channels 452, 454 are defined by upper and lower members made from low friction materials, such as Nyloil (a self lubricating high density nylon).

Tilting of the trolley base 500 is enabled by its pivotal securement to the shuttle 450 via a rear link assembly comprising rear support links 506, 508, 510, 512 and a front link assembly comprising front support links 514, 516, 518, 520, 522, 524. Front support links 514, 516 are each pivotally attached at one end to the shuttle 450 via pins 515, 517, respectively. Front support links 514, 516 are pivotally attached at the opposite end to front support links 518, 520, respectively, which in turn are pivotally attached their opposite end to front support links 522, 524, respectively. Front support links 522, 524 are pivotally secured to the trolley base 500 by fasteners 523, 525, respectively. Hand members 526, 528 are rigidly affixed to the ends of front support links 522, 524 and each includes a first slot 530, 532 and a second slot 534, 536 for engagement with first pin 912 and second pin 914, respectively, as described in more detail below.

The lowering mechanism 800 includes a lowering motor 802 with a lowering motor shaft 803 that is engaged with a lowering sprocket mechanism 804 and a lowering chain 806. The sprocket mechanism 804 transfers power from the lowering motor 602 to the two threaded lowering rods 808, 810 positioned to the inside of the feet 702, 704. The threaded lowering rods 808, 810 are rotationally affixed to the trolley 700 and engage with two lowering threaded nuts 812, 814 that are affixed to the sled 910.

Powering the lowering motor 802 in a first direction both erects the seat support assembly 900 and tilts the trolley base 500 downward. More specifically, powering the lowering motor 802 in the first direction causes the lowering rods 808, 810 to rotate within the lowering nuts 812, 814 in a first direction whereby the sled 910 slides within channels 703, 705 toward the connection point between links 906, 908 and trolley 700 and the free ends of the seat supports 902, 904 are lifted away from the trolley 700. As the sled 910 begins to move toward the connection point, the trailing bar 916 enters and engages with the channels 452, 454. In addition, the first pin 912 engages with the first slots 530, 532 (see FIG. 2D) and pushes hand members 526, 528, whereby front support links 522, 524 are rotated about the fasteners 523, 525. By virtue of rotation of the front support links 522, 524, the front link assembly pushes the trolley base 500 away from the shuttle 450 and begins to erect the rear link assembly, whereby the trolley base 500 is tilted downward. The engagement between the trailing bar 916 and the channels 452, 454 supports the trolley base 500 as it tilts until the rear link assembly is sufficiently erected and can support the trolley base 500. As the sled 910 continues to slide toward the connection point, the trailing bar 916 exits the channels 452, 454 and then the first pin 912 exits the first slots 530, 532. At this point, the second pin 914 engages the second slots 534, 536 and continues to push the hand members 526, 528 and to rotate front support links 522, 524 about the fasteners 523, 525, whereby the trolley base 500 is further tilted downward. Once the sled 910 is slid to its full extent, the seat 105 can be further lowered or raised by extending or retracting the trolley 700 using the extend mechanism 600.

Powering the lowering motor 802 in an opposite direction both collapses the seat support assembly 900 and tilts the trolley base upward. More specifically, powering the lowering motor 802 in the opposite direction causes the lowering rods 808, 810 to rotate within the lowering nuts 812, 814 in an opposite direction whereby the sled 910 slides within channels 703, 705 away from the connection point between links 906, 908 and trolley 700 and the free ends of the seat supports 902, 904 are pulled down toward the trolley 700. As the sled 910 begins to move away from the connection point, the second pin 914 engages the second slots 534, 536 whereby the second pin 914 pushes the hand members 526, 528 and rotates front support links 522, 524 about the fasteners 523, 525. By virtue of rotation of the front support links 522, 524, the front link assembly pushes the trolley base 500 toward the shuttle 450 and begins to collapse the rear link assembly, whereby the trolley base 500 is tilted upward. As the sled 910 continues to slide away from the connection point, the second pin 914 exits the second slots 534, 536 and the first pin 912 enters the first slots 530, 532 and continues to push the hand members 526, 528 in the same direction. As the rear link assembly nears its collapsed configuration, the trailing bar 916 enters the channels 452, 454 and serves to support the weight of the system.

The stand up feature is obtained by reversing the extend motor 602 and collapsing the seat brackets while the whole assembly is in full extend and tilted down position.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein. It should be understood that the arrangements described herein are for purposes of example only. As such, those skilled in the art will appreciate that other arrangements and other elements can be used instead, and some elements may be omitted altogether. Further, many of the elements may be implemented as discrete or distributed components or in conjunction with other components, in any suitable combination.

We claim:

1. A vehicle access system comprising:
a seat base for supporting a vehicle seat, the seat base including a base flange, a pivot member, a shuttle, a trolley base, a trolley, a sled, and a seat support assembly;
the base flange being adapted for securement to a floor of a vehicle;
the pivot member being supported by and pivotal relative to the base flange, whereby the vehicle seat can be moved at least partially out of a vehicle door opening;
the shuttle being supported by the pivot member and being movable along a length of the pivot member, whereby the vehicle seat can be aligned with a vehicle door opening;
the trolley base being supported by and being pivotal relative to the shuttle, whereby the vehicle seat can be lowered outside of the vehicle door opening;
the trolley being supported by the trolley base and being movable along the trolley base, whereby the vehicle seat can be extended outside of the vehicle door opening;
the sled being supported by and movable along the trolley, whereby the vehicle seat can be pivoted relative to the trolley and lowered outside of the vehicle door opening; and,
the seat support assembly being pivotal relative to the trolley and being adapted to support the vehicle seat, whereby the vehicle seat can be pivoted relative to the trolley.

2. The vehicle access system of claim 1, further comprising a pivoting mechanism, wherein the pivoting mechanism includes a motor that powers a pivot gear and a linkage assembly, the pivot gear being for pivoting the pivot member relative to the base flange and the linkage assembly being for moving the shuttle along the length of the pivot member.

3. The vehicle access system of claim 2, wherein the pivot gear comprises a worm affixed to the base flange and a worm gear affixed to the pivot member.

4. The vehicle access system of claim 2, wherein the linkage assembly comprises a link having a first end engaged with the base flange and a second end engaged with the shuttle, whereby the link moves the shuttle long a length of the pivot member as the pivot member rotates relative to the base flange.

5. The vehicle access system of claim 4, wherein the base flange includes a cam slot with a first end and a second end, and the first end of the link includes a cam follower that engages with the cam slot, whereby rotation of the pivot member causes the shuttle to move along a length of the pivot member only when the cam follower is positioned at the second end of the cam slot.

6. The vehicle access system of claim 5, further comprising a lock for holding the cam follower at the second end of the cam slot, the lock having a cam follower surface that engages with a lock cam that is affixed to and rotates with the pivot member.

7. The vehicle access system of claim 1, further comprising a tilting mechanism, wherein the tilting mechanism includes a motor that powers a trolley base tilt linkage assembly and a seat tilt linkage assembly, the trolley tilt linkage assembly being for tilting the trolley base relative to the shuttle and the seat tilt linkage assembly being for tilting the vehicle seat relative to the trolley.

8. The vehicle access system of claim 7, wherein:
the trolley base tilt linkage assembly comprises a rear link assembly and a front link assembly;
the rear link assembly comprises a plurality of links, each pivotally attached at one end to the shuttle and pivotally attached at an opposite end to a rear side of the trolley base;
the front link assembly comprises a four-bar linkage with a first link, a second link, and a third link; and,
the first link is pivotally attached about a vertical axis to a front side of the trolley base, the second link couples the first link to the third link, and the third link is pivotally attached about a horizontal axis to the shuttle, whereby the rear link assembly and the front link assembly cooperate to pivot the trolley base relative to the shuttle when the first link rotates about its vertical axis.

9. The vehicle access device of claim 8, wherein sled is configured to engages with and causes the first link to rotate as the sled moves along the trolley, whereby movement of the sled causes the trolley base to pivot relative to the shuttle about the horizontal axis.

10. The vehicle access device of claim 9, wherein:
the first link is connected to a hand member at an end opposite from the second link, whereby the vertical axis of the first link is disposed between the hand member and the second link;
the hand member includes a first slot and a second slot;
the shuttle includes a first pin longitudinally spaced from a second pin, whereby the first pin and the second pin are configured to sequentially engage with the first slot and the second slot of the hand member to rotate the first link as the sled is moved along the trolley.

11. The vehicle access device of claim 9, wherein the shuttle engages with the sled for a portion of a distance that the sled moves along the trolley, whereby the shuttle supports the trolley base as it pivots relative to the trolley.

12. The vehicle access device of claim 11, wherein the shuttle includes a pair of opposed channels, each defined by an upper and a lower member, and the sled includes a bar that engages with the pair of channels.

13. The vehicle access device of claim 9, wherein the seat support assembly is pivotally attached at one end to the shuttle, and a link is pivotally connected at one end to the trolley and at the other end to the seat support assembly, whereby as the sled moves along the trolley and pivots the trolley base relative to the shuttle, the seat support assembly simultaneously pivots relative to the trolley whereby the vehicle seat may be held approximately horizontal.

14. The vehicle access system of claim 1, further comprising an extend mechanism, wherein the extend mechanism includes a motor for moving the trolley along the length of the trolley base.

* * * * *